United States Patent [19]

Smith

[11] Patent Number: 4,650,224

[45] Date of Patent: Mar. 17, 1987

[54] APPARATUS FOR DISCHARGING SEWAGE FROM TRAVEL TRAILERS AND THE LIKE

[76] Inventor: Donald E. Smith, 26486 Thompson Rd., Perrysburg, Ohio 43551

[21] Appl. No.: 780,435

[22] Filed: Sep. 25, 1985

[51] Int. Cl.⁴ .......................................... F16L 15/02
[52] U.S. Cl. ................................... 285/165; 285/226; 285/302; 285/376; 137/899
[58] Field of Search .............. 285/165, 226, 237, 302, 285/361, 376, 402, 423; 141/382, 387, 388; 137/899

[56] References Cited

U.S. PATENT DOCUMENTS

| | | | |
|---|---|---|---|
| 2,428,381 | 10/1947 | Parry | 285/177 |
| 2,915,081 | 12/1959 | Warren | 137/899 |
| 3,496,959 | 2/1970 | Wolfe et al. | 137/899 |
| 3,623,500 | 11/1971 | Hoy | 137/899 |
| 3,712,331 | 1/1973 | Otto | 137/355.16 |
| 3,730,228 | 5/1973 | Gibbs, Sr. | 285/302 |
| 3,783,178 | 1/1974 | Philibert et al. | 285/302 |
| 3,811,462 | 5/1974 | Feliz | 285/165 |
| 3,837,689 | 9/1974 | Csatlos | 285/302 |
| 3,986,733 | 10/1976 | Esser | 285/376 |
| 4,133,347 | 1/1979 | Mercer | 285/62 |
| 4,223,702 | 9/1980 | Cook | 285/302 |
| 4,243,253 | 1/1981 | Rogers, Jr. | 285/226 |
| 4,554,949 | 11/1985 | Sell | 285/319 |

FOREIGN PATENT DOCUMENTS 0219915  2/1962  Austria ......................... 285/376

Primary Examiner—Cornelius J. Husar
Assistant Examiner—Anthony Knight
Attorney, Agent, or Firm—Marshall & Melhorn

[57]  ABSTRACT

An apparatus for discharging sewage from a holding tank on a travel trailer or the like to a sewer inlet includes a flexible inlet coupling section for connecting to the discharge fitting on the holding tank, an L-shaped fixed outlet coupling section for insertion into the sewer opening, and a telescoping tube section connected to the inlet and outlet coupling sections. The joints or connection points to the flexible inlet coupling sections are sealed by hose clamps, and the connection between the tube sections and the connection between one end of the tube sections and the outlet coupling section are sealed with locking couplings having "O" rings. The flexible coupling and telescoping section accommodate various positions of the holding tank relative to the sewer inlet. A rigid tube section can be inserted between the telescoping tube section and the outlet coupling section to further increase the length of the sewage discharge apparatus.

14 Claims, 4 Drawing Figures

APPARATUS FOR DISCHARGING SEWAGE FROM TRAVEL TRAILERS AND THE LIKE

FIELD OF THE INVENTION

The present invention relates generally to a sewage discharge device and in particular to a device for temporarily connecting a holding tank in a travel trailer or the like to a drain.

DESCRIPTION OF THE PRIOR ART

As travel has become more popular, many individuals and families have purchased travel trailers, motor homes and the like having holding tanks for retaining sewage generated during use. When it is time to empty the holding tank, typically a flexible hose is connected between a standard discharge coupling on the holding tank and a sewer or collection tank. A flexible hose is utilized because it is capable of extension and contraction to compensate for the relative positions of the holding tank outlet and the collection point. It is desirable that the hose be supported in such a manner as to enable the sewage to gravitate from the holding tank to the sewer without sags in the hose in which sewage may accumulate and freeze, and in such a manner that the hose is protected against damage. It is also desirable that the hose be supported such that it can be handled in a sanitary manner without the sewage coming in contact with the user. Furthermore, it is desirable that the hose and its support be capable of being stored in as small a space as possible when not in use.

A prior art hose supporting device is disclosed in U.S. Pat. No. 3,730,228 issued on May 1, 1973. There is shown in that patent a hose case for supporting and enveloping a flexible hose, which case is capable of longitudinal extension and contraction in any position of extension and contraction of the hose. The case is formed of a plurality of telescoping tubular sections, through which the hose extends, that can be relatively extended and contracted in correlation with the extension and contraction of the hose. One disadvantage of this device is that is must be supported in the desired position by two pairs of legs which are pivotly connected to the telescoping case. When in use, the legs must be pivoted in a downward direction to engage the ground and then pivoted upward for storage. Of course, this device is difficult, if not impossible, to utilize when the supporting ground is uneven or is not available and is bulky to store.

SUMMARY OF THE INVENTION

The present invention is concerned with a sewage discharge apparatus having a telescoping tubular body with one end connected to a flexible hose and fitting for connection to a standard discharge outlet coupling on a holding tank. The other end of the telescoping tube is connected to an L-shaped discharge pipe for insertion into a sewer inlet opening. In addition, a quick disconnect coupling can be utilized for permitting the insertion of a fixed length extension tube between the telescoping tube section and the L-shaped discharge pipe where the distance between the holding tank and the sewer inlet exceeds the maximum extended length of the discharge apparatus. When not in use, the discharge apparatus telescopes to its minimum length for easy storage.

It is an object of the present invention to provide a sewage discharge device for travel trailers and the like which can be easily operated and stored.

It is a further object of the present invention to provide a sewage discharge apparatus for travel trailers and the like which is economical to manufacture and assemble.

It is a further object of the present invention to provide a sewage discharge apparatus for travel trailers and the like which can be adapted to connect a holding tank discharge outlet to a sewer inlet from a wide variety of relative locations of the inlet and the outlet.

DETAILED DESCRIPTION OF THE DRAWINGS

DESCRIPTION OF THE PREFERRED EMBODIMENT

Figure 1:
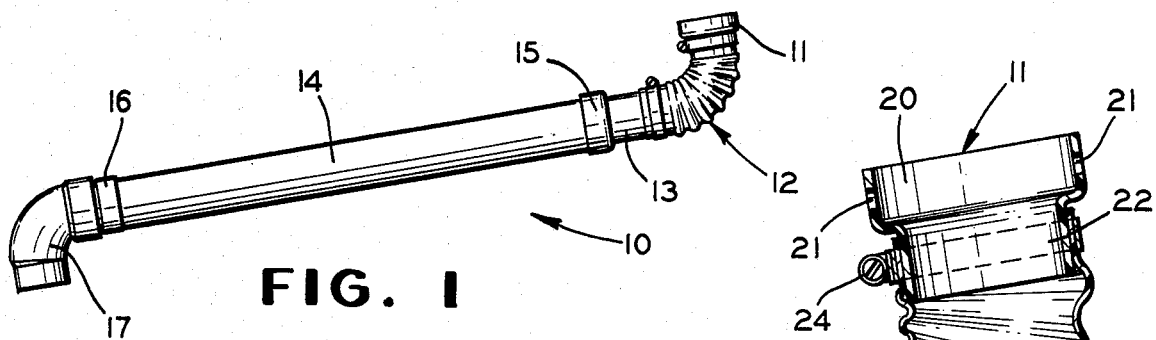
FIG. 1 is a front elevational view of a sewage discharge device according to the present invention shown in a partially extended position.

There is shown in FIG. 1, a front elevational view of a sewage discharge apparatus 10 in accordance with the present invention. A standard fitting 11 is adapted to connect to a holding tank discharge outlet coupling (not shown) of the type which is typically attached to the holding tanks of travel trailers, motor homes and the like. The fitting 11 is attached to one end of an inlet coupling section 12 which is typically formed of a flexible hose. The opposite end of the inlet coupling section 12 is attached to an inner tube section 13 which telescopes inside an outer tube section 14. The end of the outer tube section 14 into which the inner tube section 13 extends is sealed against leakage by a locking coupling 15. The opposite end of the outer tube section 14 is attached to a locking coupling 16 which in turn is attached to a fixed outlet coupling section 17. The open of the outlet coupling section 17 is adapted to be inserted into a sewer inlet opening such that the sewage discharge apparatus 10 provides a closed conduit for the discharge of sewage from a holding tank to a sewer.

Figure 2:
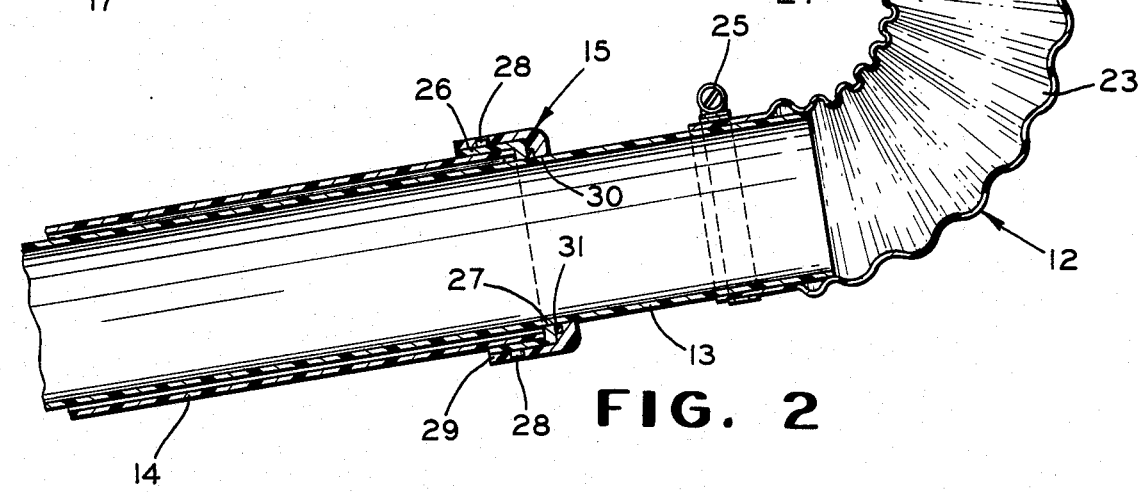
FIG. 2 is an enlarged cross-sectional view of the inlet coupling section of the sewage discharge apparatus shown in FIG. 1.

As shown in FIG. 2, the fitting 11 has a larger diameter open end 20 having a pair of coupling slots 21 formed in the walls thereof for cooperation with a locking device on the holding tank discharge outlet coupling (not shown). The fitting 11 also has a smaller diameter end 22 which snuggly fits inside one end of the flexible inlet coupling section 12. The coupling section 12 includes a length of flexible hose 23 which is firmly attached to the fitting 11 by a standard hose clamp 24. The clamp 24 encircles the outer end wall of the hose 23 and clamps the inner wall of the hose firmly against the outer wall of the smaller diameter end 22 of the fitting 11 to achieve a fluid tight seal.

The opposite end of the flexible hose 23 receives an end of the inner tube section 13 and is attached thereto by a standard hose clamp 25 which encircles the outer surface of the end of the flexible hose 23. The clamp 25 firmly holds the inner wall of the hose 23 against the outer surface of the end of the inner tube section 13 to achieve a fluid tight seal. The other end of the inner tube section 13 telescopes inside the outer tube section 14. The inner tube section 13 can be formed of a standard 2⅜" inside diameter polyvinylchloride pipe, for example, while the outer tube section 14 can be formed from a standard 3" inside diameter polyvinylchloride pipe. The locking coupling 15 includes an inner ring 26 which accepts the end of the outer tube section 14. An inwardly extending radial flange 27 is formed at one end of the ring 26 to abut the end of the outer tube section 14 and the ring 26 is attached to the tube section 14 by a suitable adhesive.

Typically, a pair of ears or posts 28 extend radially outwardly from the outer wall portion of the inner ring 26 and engage slots formed in the wall of an outer ring 29. The bottom wall of the outer ring 29 has an inwardly extending flange 30 formed at one end thereof to abut the flange 27. A circumferentially extending "O" ring groove is formed about the inner edge of the flange 30 to accept an "O" ring 31. When the outer ring is engaged with the inner ring 26, the ears 28 engage the coupling slots formed in the outer ring 29 to lock the rings together and the "O" ring 31 is compressed between the inner ring flange 27 and the outer ring flange 30 to seal against the outer surface of the inner tube section 13 as the tube 13 is moved into and out of the interior of the outer tube section 14.

Figure 3:
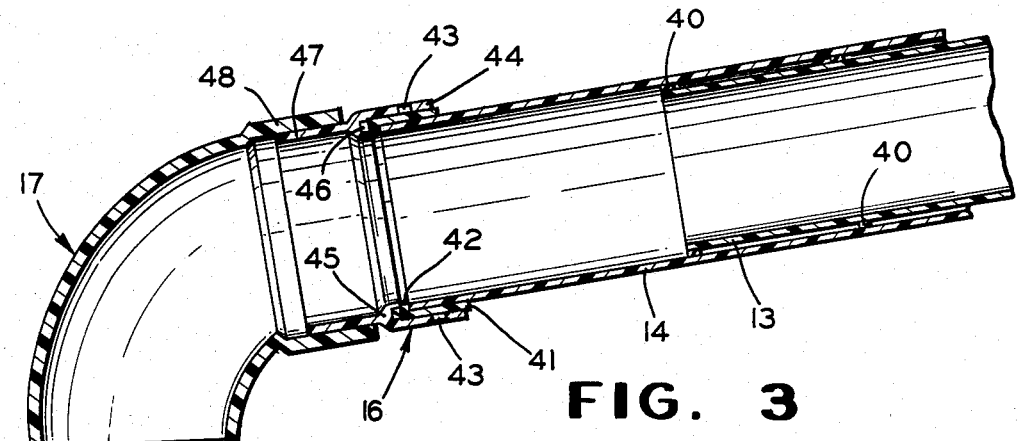
FIG. 3 is an enlarged cross-sectional view of the outlet coupling section of the discharge apparatus shown in FIG. 1.

At the opposite end of the inner tube section 13 there can be attached to the outer surface one or more circumferential seals 40 which seal against the inner surface of the outer tube section 14 as shown in FIG. 3. The other end of the outer tube section 14 is attached to th locking coupling 16. The coupling 16 is similar to the locking coupling 15 in that an inner ring 41 is attached to and accepts the end of the outer tube section 14. An inwardly extending flange 42 is formed at one end of the inner ring 41 to abut the end of the outer tube section 14. A pair of radially outwardly extending ears or posts 43 are formed on an outer surface of the inner ring 41 and engage slots formed in the walls of an outer ring 44. The outer ring 44 has an inwardly radially extending step 45 formed on the inner wall thereof including an "O" ring groove for accepting an "O" ring 46. When the outer ring 44 is rotated into engagement with the inner ring 41, the ears or posts 43 engage the slots in the outer ring 44 and lock the two rings together. In this position, the "O" ring 46 is compressed to seal the connection between the rings 41 and 44.

The outer ring 44 also includes a tubular extension 47 which extends inside one end of an L-shaped outlet coupling section 17. The coupling section 17 can be formed from a standard "L" coupler made of polyvinylchloride material. The coupling section 17 includes a female end 48 for accepting the extension 47 and a male end 49 which fits into a sewer inlet (not shown). The inner ring 41 can be attached to the outer tube section 14 and the extension 47 can be attached to the female end 48 with a suitable adhesive for fluid tight seals.

When the sewage discharge apparatus 10 is to be stored, the inner tube section 13 is telescoped inside the outer tube section 14 to reduce the length of the apparatus to a minimum. The apparatus is then ready for storage in any suitable space in a travel trailer, motor home or the like. When it is time to utilize the apparatus 10, the fitting 11 is connected to the discharge outlet coupling on the holding tank to be emptied and the inner tube section 13 is extended from the outer tube section 14 a distance sufficient to place the male end 49 of the coupling section 17 at the inlet of a sewer. The flexible inlet coupling section 12 accommodates various angles created by the relative positions of the holding tank and the sewer.

Figure 4:
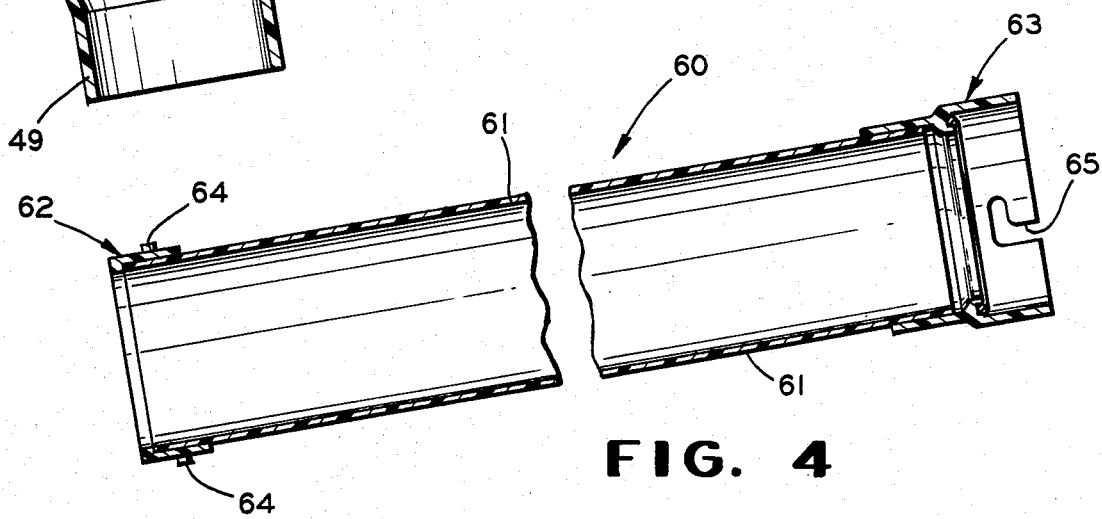
FIG. 4 is a cross-sectional view of an extension section for use with the outlet coupling section shown in FIG. 3.

There is shown in FIG. 4, an extension section for the sewage discharge apparatus in accordance with the present invention. The extension section permits the fixed outlet coupling section 17 to be disconnected from the tube section 14 for the insertion of the extension section to accommodate distances which are longer than the fully extended length of the sewage discharge apparatus 10 of FIG. 1.

There is shown in FIG. 4 an extension section 60 for use with the sewage discharge apparatus 10. The extension section 60 includes a tubular pipe 61 having a male coupler 62 attached at one end and female coupler 63 attached at the other end thereof. The couplers 62 and 63 are similar to the locking coupler 16 of FIG. 3. A pair of post 64 formed on the male coupler 62 extend radially outwardly to cooperate with the slots formed in the outer ring 44 of FIG. 3. The female coupler 63 has a pair of slots 65 (only one is shown) formed therein for cooperation with the posts 43 of FIG. 3. Therefore, the extension section 60 can be inserted between the locking coupling 16 and the outer tube section 14. The extension section 60 is utilized in case the distance between the holding tank outlet and the sewer inlet is greater than the maximum extended distance of the sewage discharge apparatus 10. The extension section 60 can be formed of any suitable length and more than one such extension section can be utilized to provide the necessary spacing between the flexible inlet coupling section 12 and the fixed outlet coupling section 17.

In accordance with the provisions of the patent statutes, the principle and mode of operation of the invention have been explained in its preferred embodiment. However, it must be understood that the invention may be practiced otherwise than specifically illustrated and described without departing from its spirit or scope.

What is claimed is:

1. A sewage discharge apparatus for connecting a source of sewage to a desired destination for the sewage comprising:
    an inlet coupling section having a fitting attached to one end thereof, said fitting having a larger diameter opening for coupling to an outlet fitting attached to a source of sewage and a smaller diameter opening, and a flexible tube with said smaller diameter opening extending into and attached to one end and having an oppsite end;
    a telescoping section having an inner tube section telescoping inside an outer tube section and having one end of said inner tube section connected to said opposite end of said inlet coupling section; and
    an outlet coupling section including a generally L-shaped tube having one end connected to an opposite end of said telescoping section and having an opposite end with means for connection to a destination for sewage, whereby said flexible tube and said telescoping section are each slectively adjustable for accommodating different relative positions of a source of sewage to be emptied and a destination for the sewage, said outlet coupling section including a locking coupling having an inner ring attached to said outer tube section, an outer ring attached to said generally L-shaped tube, and locking means for releasably attaching said inner ring to said outer ring.

2. The apparatus according to claim 1 including a hose clamp encircling an outer surface of said flexible tube for attaching said flexible tube to said fitting in a fluid tight relationship.

3. The apparatus according to claim 1 wherein said flexible tube is formed from a length of flexible hose.

4. The apparatus according to claim 1 wherein said inlet coupling section includes said flexible tube having said opposite end open for accepting said one end of said inner tube section, and further includes a hose clamp encircling said flexible tube to firmly connect said flexible tube to said inner tube section in a fluid tight relationship.

5. The apparatus according to claim 1 wherein said locking means includes at least one radially outwardly extending post formed on said inner ring for cooperation with at least one slot formed in a wall of said outer ring.

6. The apparatus according to claim 1 including an "O" ring positioned between said inner ring and said outer ring for sealing against fluid flow between said inner and outer rings.

7. The apparatus according to claim 1 including another locking coupling having another inner ring attached to said outer tube section, another outer ring slidably engaging said inner tube section, and another locking means for releasbly attaching said another inner ring to said another outer ring.

8. The apparatus according to claim 7 wherein said another locking means includes at least one radially outwardly extending post formed on said another inner ring for cooperation with at least one slot formed in a wall of said another outer ring.

9. The apparatus according to claim 7 including an "O" ring positioned between said another inner ring and said another outer ring for sealing against fluid flow between said another inner and outer rings.

10. The apparatus according to claim 7 including an "O" ring positioned between said another outer ring and an outer surface of said inner tube section for sealing against fluid flow between said another outer ring and said inner tube section.

11. A sewage discharge apparatus for connecting a discharge outlet of a holding tank in a travel trailer or the like to a destination for the sewage in the holding tank comprising:
    an inlet coupling section having a fitting for connection to a discharge outlet of a holding tank and a flexible hose section having one end connected to said fitting;
    a telescoping section having an inner tube section connected at one end to an opposite end of said flexible hose section and an outer tube section having one end for accepting an opposite end of said inner tube section, said inner and outer tube sections telescoping with one another; and
    an outlet coupling section having a generally L-shaped tube with one end connected to an opposite end of said outer tube section and an opposite end for discharging sewage, whereby said flexible hose section and said telescoping section are selectively adjustable for accommodating different relative positions of a holding tank to be emptied and a destination for sewage in the holding tank, said outlet coupling section including a locking coupling having an inner ring attached to said outer tube section, an outer ring attached to said generally L-shaped tube, and locking means for selectively releasably attaching said inner ring to said outer ring.

12. The apparatus according to claim 11 wherein said locking coupling includes an extension section connected between said outer ring and said generally L-shaped tube.

13. The apparatus accroding to claim 11 including another locking coupling attached to said outer tube section and having means to seal against fluid flow from an interior to an exterior of said telescoping section between said inner and outer tube sections.

14. The apparatus according to claim 11 wherein said locking coupling includes means to seal against fluid flow from an interior to an exterior of said telescoping section between said outer tube section and said generally L-shaped section.

* * * * *